Dec. 16, 1952 R. E. GRILLS 2,621,693
POWER-OPERATED MEAT SAW
Filed May 29, 1950 4 Sheets-Sheet 1

Inventor
ROY E. GRILLS
by Weatherford and Weatherford
Attorneys

Dec. 16, 1952  R. E. GRILLS  2,621,693
POWER-OPERATED MEAT SAW
Filed May 29, 1950  4 Sheets-Sheet 3
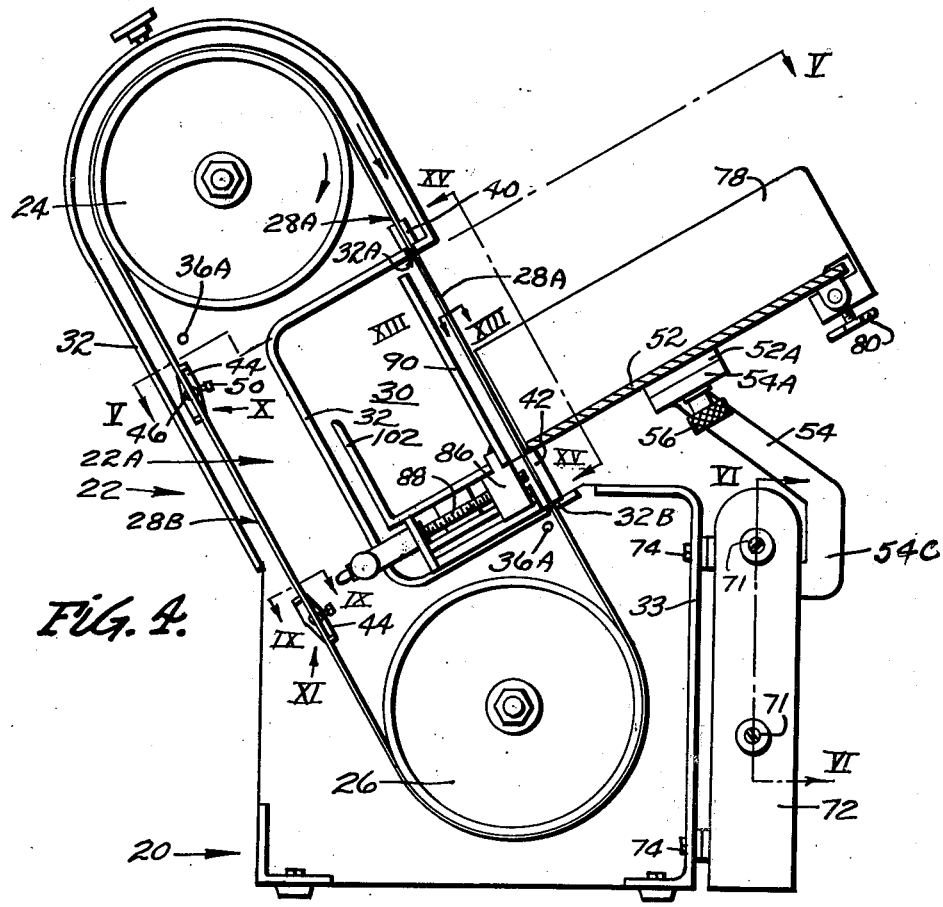
FIG. 4.
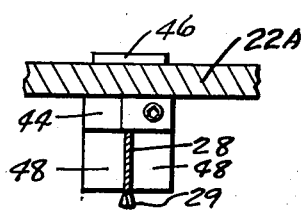
FIG. 9.
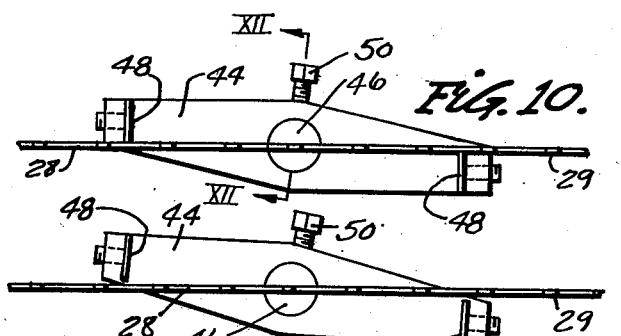
FIG. 10.
FIG. 11.
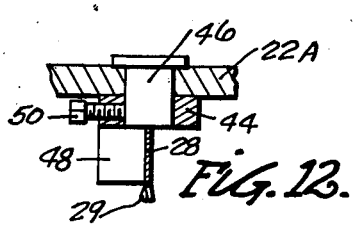
FIG. 12.
INVENTOR.
ROY E. GRILLS Dec. 16, 1952 R. E. GRILLS 2,621,693
POWER-OPERATED MEAT SAW
Filed May 29, 1950 4 Sheets-Sheet 4
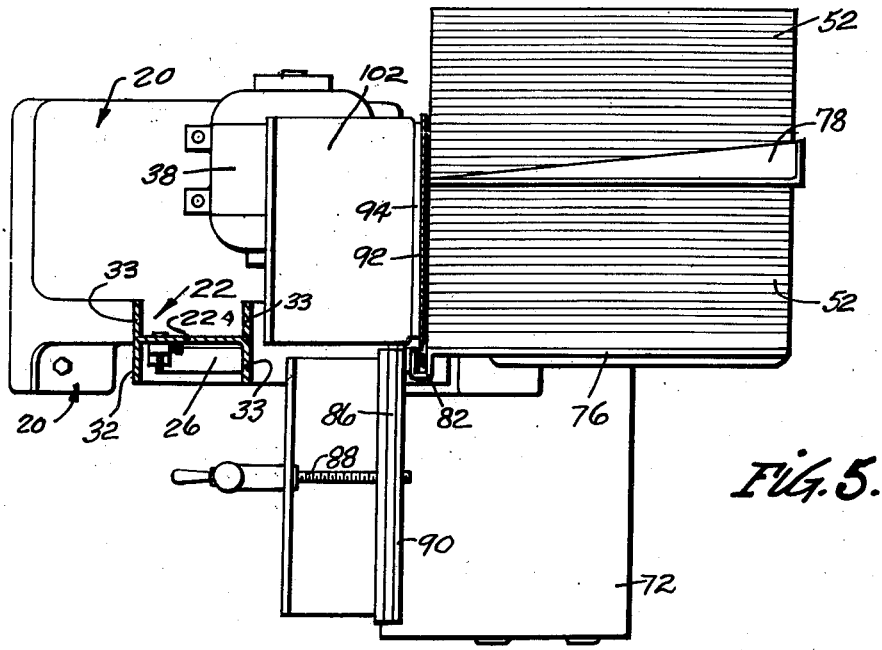
FIG. 5.
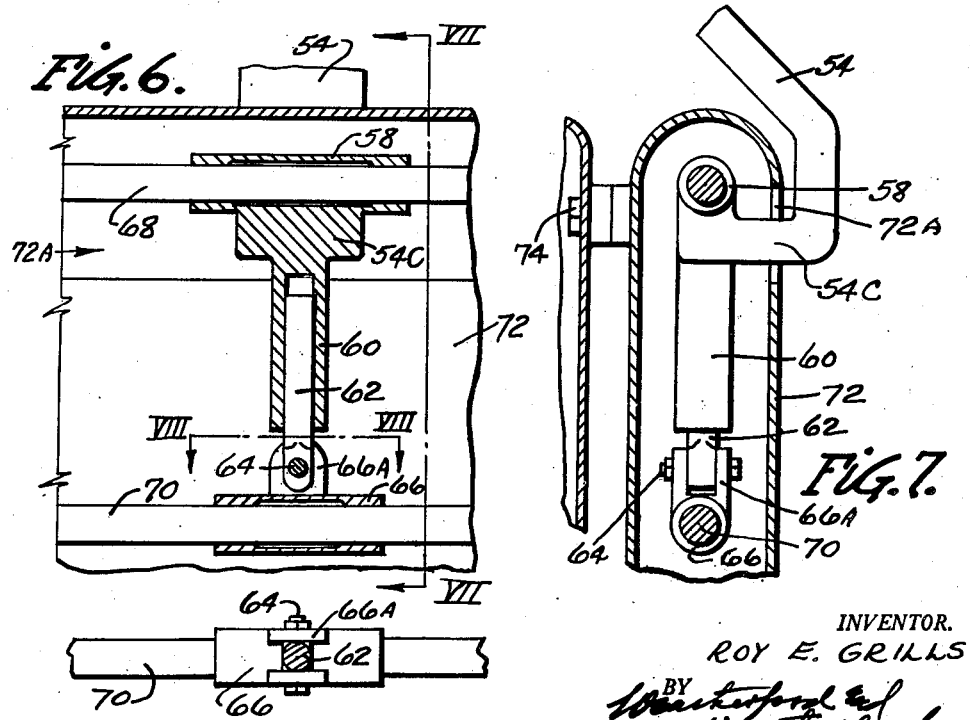
FIG. 6.
FIG. 7.
FIG. 8.
INVENTOR.
ROY E. GRILLS Patented Dec. 16, 1952

2,621,693

UNITED STATES PATENT OFFICE 2,621,693

POWER-OPERATED MEAT SAW

Roy E. Grills, Memphis, Tenn.

Application May 29, 1950, Serial No. 164,936

3 Claims. (Cl. 146—88)

This invention relates to improvements in band saw type meat cutters which make use of a shiftable meat supporting table, and more particularly to a band saw cutter of the general type shown in my Patent No. 2,430,504, issued November 1, 1947, which employs a band saw inclined to the vertical and a meat supporting table having complementary inclination from the horizontal, which table is shifted by hand to bring the meat into contact with the saw and to retract it after the cut is made.

In cutting meat with a band saw, it is usual to support the meat on a table and against an abutment or guide against which the piece of meat to be cut is held and to shift the table and slidably advance the meat along the guide toward the saw. Beyond the saw a second abutment or guide, hereinafter called a divider plate or divider, is desirable to support the piece behind the saw, during and after severance of a slice or cut therefrom, the divider plate supporting the piece also during return movement, more or less free from smearing action against the saw blade. The divider to provide effective stiffness must almost necessarily be of greater thickness than the saw blade, and deflects the slice or cut as it is detached by the saw, the thickness of the divider causing little trouble unless a bone is encountered and cut. In making the cut, little difficulty is found in cutting through the bone, but the bone cut is substantially always only partly made when the bone reaches the divider, and cutting movement is stopped unless the bone already cut is undesirably broken, in which case uneven and objectionable surfaces in both piece and slice and variations of thickness in the slice are caused, usually resulting in abandonment of the divider.

Difficulty is also often had in completing an even thickness of cut because the overhang of the stock allows deflection away from the saw as the end of the cut nears, and in endeavoring to prevent this deflection there is human urge to manually push against the overhanging part the piece immediately in front of the saw and a dangerous situation is set up, often resulting in accident, the dangerous condition being definitely accentuated or perhaps invited by the fact that the saw blade is hidden by the meat, and after the cut is complete the exposed portion of the blade is dangerously near the operator until the piece of meat is retracted to begin a new cut.

The objects of the invention are:

To provide means for guiding the piece of meat from which the slice is being severed in proximity to the back edge of the saw and there beyond and to divide off the severed slice during cutting, and to similarly support the meat during return movement without smearing contact with the saw, which guiding means is substantially free from dividing action while cuts are being made through bone;

To provide means to guide the meat behind the saw and deflect the severed portion or slice, which guide means is automatically displaced during cuts through bone or gristle;

To provide means for supporting the meat and advancing it against the saw, which includes a shield adapted to guard the saw as severance of the slice is completed;

To provide means for shielding the saw as each cut is completed;

To provide means for shielding the saw as each cut is completed, which means assists in pushing the meat against the saw and thereby prevents uneven slice thickness at the end of the cut;

To provide means for minimizing bone dust in effecting cuts through bone;

To provide means for scraping the blade after cutting action to remove meat and bone dust;

To provide means for effecting preliminary and final scraping action and for regulating the scraping pressure on the blade;

To provide means for utilizing deflection of the blade as a part of such regulating means;

To provide a more efficient type of saw blade; and

To generally improve the details of construction of a band saw for cutting meat.

The means by which the foregoing and other objects are accomplished and the manner of their accomplishment will readily be understood from the following specification on reference to the accompanying drawings, in which:

Fig. 4 is an additional front elevational view corresponding to Fig. 1 with the front cover removed and with the meat supporting table in sectional elevation taken on the line IV—IV of Fig. 2.

Fig. 5 is a sectional plan view taken on the line V—V of Fig. 4 with the table at the end of cutting movement.

Fig. 6 is a fragmentary sectional elevation taken on the line VI—VI of Figs. 1 and 4 showing bearing sleeves and slide bars supporting the meat table.

Fig. 7 is a corresponding cross sectional elevation on the line VII—VII of Figs. 3 and 6; and Fig. 8 is a corresponding sectional plan on the line VIII—VIII of Fig. 6.

Figs. 9 through 12 are enlarged views of blade strippers.

Fig. 9 is a fragmentary sectional plan taken on the line IX—IX of Fig. 4.

Figs. 10 and 11 are front elevations of two strippers respectively indicated by arrows X and XI of Fig. 4; and Fig. 12 a fragmentary sectional plan view taken on the line XII—XII of Fig. 10.

Fig. 13 is a fragmentary sectional plan of the saw shield and housed saw blade taken on the line XIII—XIII of Fig. 4.

Fig. 14 is a fragmentary sectional plan view, taken on the line XIV—XIV of Fig. 3, showing attachment of one of the guide members to the housing therefor.

Fig. 15 is a fragmentary side elevational view of the divider plate and mounting therefor.

Fig. 16 is a section on the line XVI—XVI of Fig. 15.

Fig. 17 is a side view of a portion of the saw blade shown in Fig. 15; and

Fig. 18 is a similar view of an alternate reversible form of the blade; and

Fig. 19 is a transverse sectional plan of the blade on the line XIX—XIX of Fig. 18.

Figure 1:
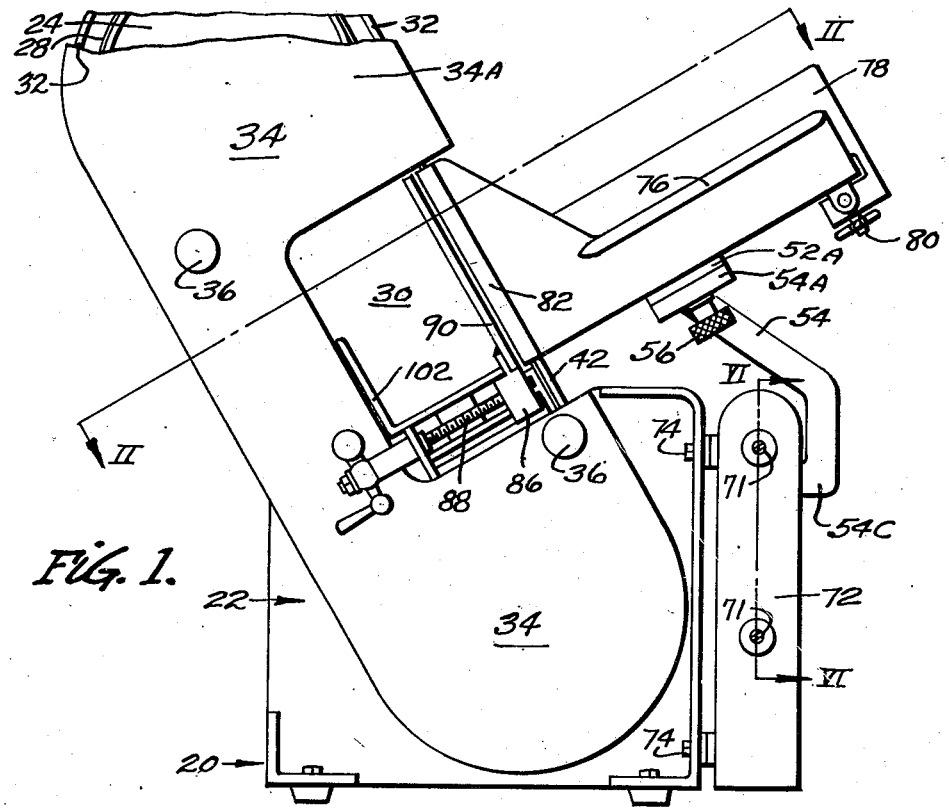
Fig. 1 is a front elevational view of the saw as set up for use, a fragmentary portion of the top of the view being broken away.
Figure 2:
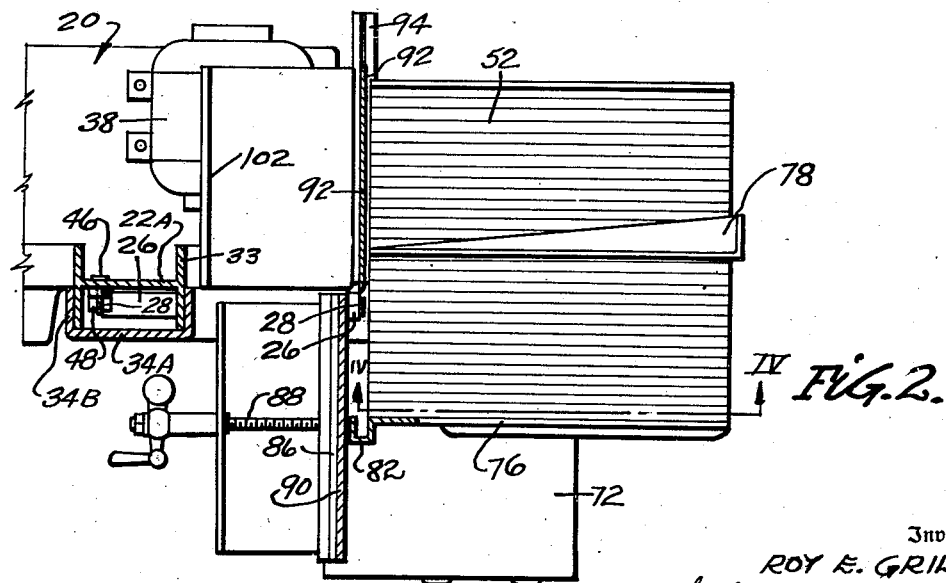
Fig. 2 is a sectional plan view on the line II—II of Fig. 1 with the meat supporting table partially shifted forward.
Figure 3:
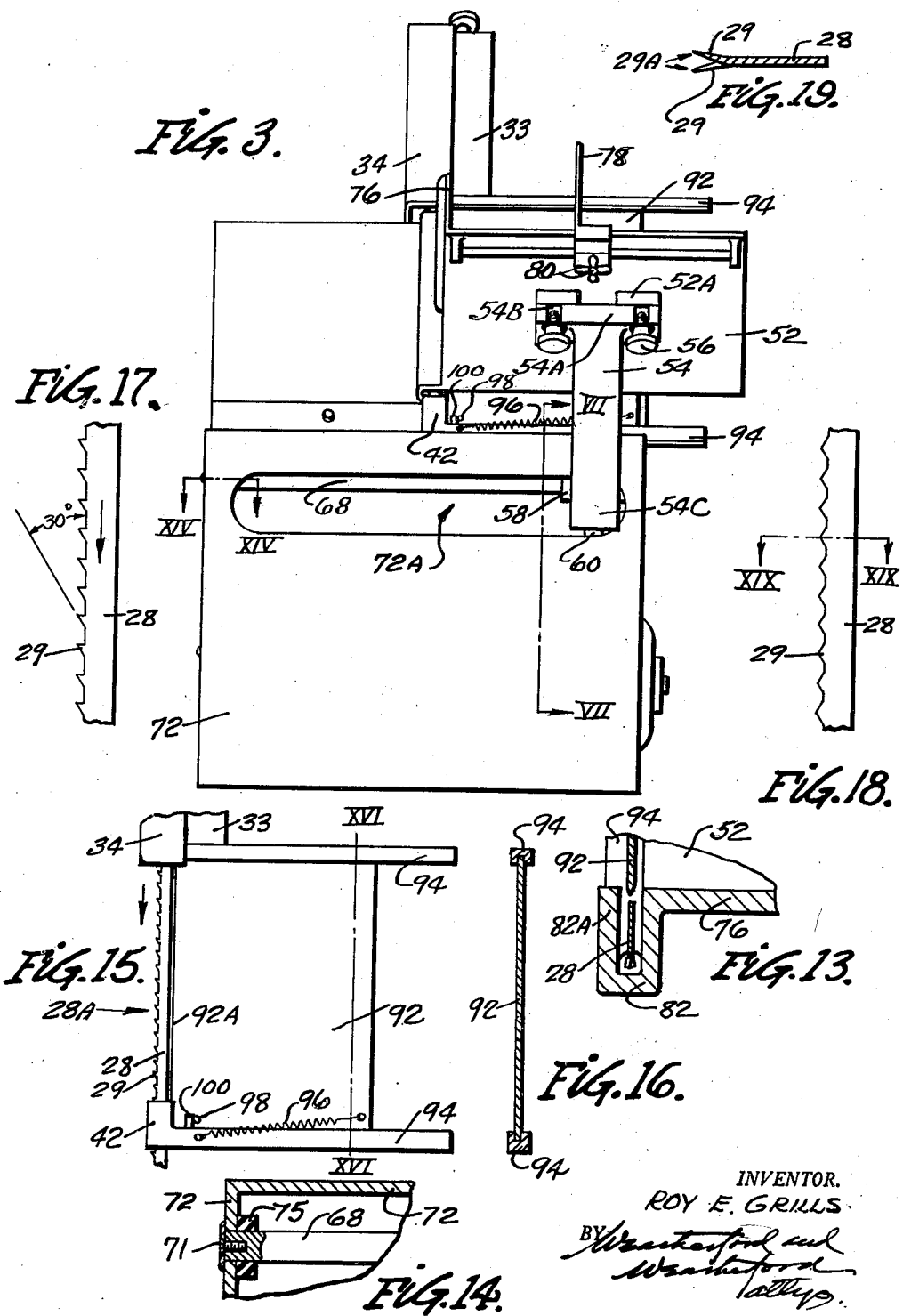
Fig. 3 is a side elevational view.

Referring now to the drawings which disclose a preferred embodiment of my invention, the numeral 20 designates a base from which a frame 22 diverges upwardly and laterally some thirty degrees from the vertical. The frame preferably includes a transversely disposed plate portion 22A which extends to the base 20 and supports and journals band saw pulleys 24 and 26 around which a band saw 28, having teeth 29 is disposed. Intermediate the pulleys the plate is deeply notched to provide a throat 30 across which the cutting flight 28A of the saw travels. The peripheral edge of the plate is provided with a forwardly projecting flange 32 of depth to house the pulleys and saw, which flange may embrace the bottom, back and top of the throat, extends upwardly from the top of the throat over and around the upper pulley, and downward along the plate substantially to the level of the bottom of the throat, and is provided with notches 32A, 32B, for the cutting flight of the saw. The plate portion 22A preferably also has additional strengthening flange portions 33. During use, as shown in Figs. 1 and 2, the housing for the saw is completed by a cover 34 having a plate portion 34A and a peripheral flange portion 34B, the cover being cut away over the throat 30 and exteriorly conforming to the shape of the flange 32 above the throat, and is preferably symmetrically shaped therebelow. The cover is removably held in place by thumb screws 36 which are screwed into holes 36A (Fig. 4) in the plate 22A. When the cover is in place the blade of the saw is completely housed except across the throat 30. The lower saw pulley 26, preferably is driven by a direct connected motor 38 mounted on the base 20. The saw preferably is guided at the top and bottom of the throat 30 by guide blocks 40, 42 which laterally guide and back up the saw against rearward displacement.

The saw is a thin narrow blade having teeth 29 which preferably diverge oppositely to the direction of travel of the blade at an acute angle of the nature of thirty degrees to provide cutting edges 29A and may either terminate abruptly as in Fig. 17, or converge again to the blade as in Fig. 18, in which latter case the blade may be reversed and inverted after the tooth cutting edges become dull and the opposite converging tooth edges be used until they become dull. The teeth 29 are alternately deflected outward from the surface planes of the blades in usual manner and preferably have the cutting edges 29A sharpened as shown in Fig. 19 so that they may cut rather than tear the meat and bone. It is here noted that the bone is somewhat soft during cutting and hardens rapidly after cutting and exposure to the air to the hardness usually associated with the term bone.

Blade cleaning

The blade cutting downward through the meat carries with it bone and meat cuttings or dust, which unless removed carry over and smear on the subsequent cut. Interposed between the pulleys 26 and 24 and spaced along the up flight portion 28B of the blade are cleaners of substantial identity which each comprise an arm 44 centrally mounted on a pin 46 suitably secured through the plate portion 22A of the frame rearward of the line of flight 28B of the blade. The arms carry at their opposite ends scrapers 48 adapted to contact the opposite surfaces of the blade, are turnable about their respective pins 46 to effect such contact and are held in contact by the set screws 50. Scrapers contact with the blade being on a free flight portion of the blade may deflect the blade oppositely and provides an easy way of securing and maintaining desired scraping pressure.

Meat supporting table

The meat is supported for cutting by a table 52 which is substantially at right angles to the cutting flight 28A of the saw and is carried by an arm 54 which has at its upper end a mounting flange 54A on which a boss or bosses 52A, integral with the table are seated and are secured by thumb screws 56 which may be readily loosened or removed to detach the table as for cleaning. Preferably the flange 54A is provided with slots 54B which allow table removal by loosening the thumb screws and without removing them. The arm 54 extends laterally outward and downward and has a reversely continued portion 54C integrally carrying a bearing sleeve 58 and a downwardly extending post portion 60. Telescopically engaging the post portion 60 is a complementary post portion 62 which is connected through a transversely disposed pin 64 and flanges 66A to a second bearing sleeve 66. The sleeves 58 and 66 are respectively slidably mounted on substantially parallel slide bars 68 and 70 extending fore and aft, the telescoping and hinge movements of the post parts automatically compensating for any lack of parallelism of the bars and effectually preventing binding of the bearings on the bars. The slide bars are secured as by screws 71 to opposite end portions of a housing 72 which is secured to the frame as by cap screws 74, in underlying relation to the table and is longitudinally slotted at 72A for movement of the arm portion 54C. A stop 75 on the bar 68 limits forward movement of the sleeve 58 and the table and a similar stop (not shown) at the opposite end of the bar limits shift of the table toward the saw.

Along its forward edge the table 52 has an upstanding flange or crowder 76 against which meat for cutting is held either by hand or by a slidable clamping member 78 which may be secured in desired position by a clamping screw 80. The crowder flange 76 extends inwardly into adjacency to the approach path to the saw 28 and is forwardly offset somewhat in excess of the width of the blade, and continued inward and rearwardly on the inner side of the blade to form a substantially U-shaped shield 82 housing the saw blade at the end of cutting shift of the table 76. The inner leg 82A (Fig. 13) of the U terminates flush with the rear face of the crowder flange 76 and forms a continuation beyond the saw of the flange.

The shield is of height to extend from the top of the lower guide 42 to the underside of the top of the throat 30 and together with the cover 34 and the guide 42 effects a complete shield against accidental or other contact with the saw as the cut in the meat is completed, and the rear end of the shield portion 82A prevents deflection of the slice by pressure of the cutting edge of the blade as severance of the slice is being completed.

Mounted on the frame and extending forwardly therefrom is a support member 84, which carries a slide 86, the slide being shiftable toward and away from the saw and meat table as by a hand operated screw 88. Carried by the slide is a gage plate 90 which extends upward from the slide parallel with the saw flight 28A and is movable by the screw 88 toward and away from the meat table and saw to determine the projection of the meat beyond the saw and the resulting thickness of the slice cut off.

Disposed rearward of the saw is a guide or divider plate 92 along and against which the cut surface of the meat on the table 52 slides during and after removal of a slice. The divider plate for stiffness is preferably thicker than the saw blade and deflects the slice as the cut is made. The plate is mounted top and bottom in grooved support members carried by the frame 22 and so far as these members are concerned are free to be displaced rearwardly as when the saw has partially cut through a bone in the meat and the bone engages the front edge of the slide. The divider plate is preferably resiliently urged toward the back edge of the saw by a tension spring 96 anchored at its forward end to one of the guides 94 and at its rear end to the plate. Movement of the plate toward the saw is limited by stops 98 and 100 respectively carried by the plate and one of the support members as the member 94. The stops are set to hold the forward edge of the plate 92A away from contact with the saw but in adjacency thereto.

An angle shaped tray 102 is preferably removably supported by the frame 22 inward of the divider plate and rearward of the saw to receive the slice cut off by the saw and deflected by the plate.

In use, with the cover 34 in place and the table 52 shifted forward against the stop 75 a piece of meat (not shown) is placed on the table 52 with its forward side against the crowder flange 76 and is either there held by hand or the clamping member 78 is brought against the back side of the piece to hold it against the crowder flange.

The gage plate 90 is shifted by the screw 88 toward or away from the saw to set up the desired thickness of slice to be cut off, the piece of meat is shifted laterally to seat against the gage plate. The table is shifted longitudinally backward to bring the meat against the saw and cut off a slice which drops into the tray 102, the piece of meat from which the slice has been cut being guided and supported behind the saw by the divider plate 92.

In making the original cut, and subsequent cuts, the rear end of the shield portion 82A backs up the meat to be cut off as the crowder flange backs up the remainder of the piece and insures completion of a straight cut, the shield 82 together with the meat itself tends to guard the operator from contact with the saw, and as the saw finishes the cut the shield embraces and completely houses the saw against any chance of operator contact.

When a cut is completed, the table is retracted, the clamping plate holding the piece of meat against rearward displacement, and the piece is slid along the divider plate, and past the saw. When the table 52 is fully retracted, the piece of meat is shifted against the gage plate 90 and the slice cutting operation repeated.

In making cuts where bone exists the slice portion cut off before the bone is reached and until the saw reaches its full depth in the bone is diverged by the divider plate 92. Thereafter the plate encounters the bone and being unable to further diverge the slice until the bone is entirely cut through, is forced backward against the resistance of the spring 96 until the bone cut is complete, after which the plate is returned to original position by the spring. During rearward displacement, the divider plates moves backward with and supports the meat against lateral displacement.

As the blade passes downward from the cut, and around the lower pulley and upward, it carries with it particles of both meat and bone which engage in their upward movement against the lower faces of the scrapers of the lower and upper strippers 44 successively and by the successive action of these scrapers 48 is effectually cleaned, the meat and bone particles dropping into the lower portions of the cover 34 from which they are subsequently cleaned by removing and washing the cover.

It will be understood that the term slice herein used designates a portion of the meat cut off from the main piece, whether the thickness of the piece be that usually known as a slice, a thicker portion such as is usually designated a chop or an even greater thickness usually designated as a cut or roast, the word slice being used instead of the word cut, because of the necessity of using the word cut largely as a verb, from time to time, in the specification.

It will be further understood that the design, connections and many other features of the invention are primarily illustrative only of a construction which may be used and are not governing except where they may be specifically set out in any claim or claims, and that many of the features hereof may be independently used whether other features shown be used or not.

Having described my invention what I claim is:

1. In a meat cutter which comprises a frame and frame carried parts including a saw blade of band type, a meat supporting table for moving the meat toward and past the saw, a gage plate forwardly of the saw against which the meat supported on the table is held to determine the thickness of slice to be cut off and a divider plate disposed immediately rearward of and alined with the saw, grooved members alined behind said blade, slidably mounting opposite edges of said plate, resilient means urging said plate toward the back of said saw and means for limiting movement of said plate toward said saw.

2. In a meat cutter which comprises a frame and frame carried parts including a saw blade of band type, a meat supporting table for moving the meat toward and past the saw, a gage plate forwardly of the saw against which the meat supported on the table is held to determine the thickness of slice to be cut off and a divider plate of greater thickness than said saw, disposed immediately rearward of the saw, grooved members alined behind said blade, slidably mounting opposite edges of said plate, resilient means urging said plate toward the back of said saw and means for limiting movement of said plate toward said saw.

3. In a meat cutter which comprises a frame and frame carried parts including a saw blade of band type, a meat supporting table for moving the meat toward and past the saw, a gage plate forwardly of the saw against which the meat supported on the table is held to determine the thickness of slice to be cut off and a divider plate disposed immediately rearward of the saw, grooved members alined behind said blade, slidably mounting opposite edges of said plate, resilient means urging said plate toward the back of said saw and means for limiting movement of said plate toward said saw.

ROY E. GRILLS.

REFERENCES CITED

The following references are of record in the file of this patent:

UNITED STATES PATENTS

| Number | Name | Date |
| --- | --- | --- |
| 866,354 | Gill | Sept. 17, 1907 |
| 1,088,573 | Heldmann | Feb. 24, 1914 |
| 1,129,360 | Niebling | Feb. 23, 1915 |
| 1,959,184 | Walker | May 15, 1934 |
| 1,963,449 | Rubin | June 19, 1934 |
| 2,169,517 | Biro | Aug. 15, 1939 |
| 2,371,731 | Boice et al. | Mar. 20, 1945 |
| 2,401,972 | Sellmeyer | June 11, 1946 |
| 2,423,363 | Biro | July 1, 1947 |
| 2,430,504 | Grills | Nov. 11, 1947 |
| 2,535,714 | Anderson et al. | Dec. 26, 1950 |